United States Patent
Bohman, Jr. et al.

(10) Patent No.: US 12,436,191 B2
(45) Date of Patent: Oct. 7, 2025

(54) AUTHENTICATING ELECTRONIC DEVICES VIA MULTI TONE ANALYSIS

(71) Applicant: Government of the United States as represented by the Secretary of the Air Force, Wright-Patterson AFB, OH (US)

(72) Inventors: Carl Bohman, Jr., Springfield, OH (US); Aaron Jennings, Miamisburg, OH (US); Christian Eakins, Columbus, OH (US); Mark Skouson, Beavercreek, OH (US); Richard Ott, Dayton, OH (US); Jamin McCue, Upper Arlington, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 334 days.

(21) Appl. No.: 18/063,060

(22) Filed: Dec. 7, 2022

(65) Prior Publication Data

US 2023/0176119 A1 Jun. 8, 2023

Related U.S. Application Data

(60) Provisional application No. 63/346,386, filed on May 27, 2022, provisional application No. 63/286,677, filed on Dec. 7, 2021.

(51) Int. Cl.
*G01R 31/317* (2006.01)
*G01R 31/28* (2006.01)

(52) U.S. Cl.
CPC .... *G01R 31/31719* (2013.01); *G01R 31/2837* (2013.01); *G01R 31/2841* (2013.01)

(58) Field of Classification Search
CPC .......... G01R 31/31719; G01R 31/2837; G01R 31/2841
See application file for complete search history.

(56) References Cited

U.S. PATENT DOCUMENTS

| | | |
|---|---|---|
| 9,188,622 B1 | 11/2015 | Tangyunyong et al. |
| 9,959,430 B2 | 5/2018 | Hamilton et al. |
| 10,145,894 B1 | 12/2018 | Tangyunyong et al. |

(Continued)

OTHER PUBLICATIONS

K. Liszewski and T Bergman, "Battelle Barricade: Microelectronic Device Authenication and Counterfeit Detection Using Power Analysis," ISTFA Proc. (2017).

(Continued)

*Primary Examiner* — Hee K Song
(74) *Attorney, Agent, or Firm* — AFMCLO/JAZ; Eugene P. Sunday

(57) ABSTRACT

Methods and systems for authenticating electronic devices via multi tone analysis. A method for authenticating a device under test (DUT) of a type of DUT includes imparting voltage tones to the DUT. The voltage tones are proximate a frequency of interest that is associated with the type of DUT. Using a measurement response of the DUT to the voltage tones, an electronic signature of the DUT is determined. The DUT is determined to be authentic when the electronic signature of the DUT substantially matches an electronic signature of an authority DUT of the type of DUT.

11 Claims, 6 Drawing Sheets

(56) References Cited

U.S. PATENT DOCUMENTS

| | | | |
|---|---|---|---|
| 10,475,754 B2 | 11/2019 | Keller, III et al. | |
| 10,685,144 B2 | 6/2020 | Hamilton et al. | |
| 2021/0148977 A1* | 5/2021 | Bhunia | G01R 31/318328 |

OTHER PUBLICATIONS

K.A. Sutherlin, "Investigation of Electromagnetic Signatures of a FPGA using an APREL EM-ISIGHT System," Thesis Presented to the Faculty of the Department of Systems Engineering and Management, Graduate School of Engineering and Management, Air Force Institute of Technology, 2015.

A. Lowne, "Curve-trace testing can reveal whether an incoming batch of ICs are bogus without resorting to destructive inspection measures," Detecting Counterfeit Without a Microscope, Ed. L. Teschler (2020) available at https://www.te.standmeasurementtips.com/detecting-counterfeit-integrated circuits-without-a-microscope, accessed Mar. 24, 2021.

T.D. Bergman and K.T. Liszewski, "Battelle Barricade: A Nondestructive Electronic Component Authentication and Counterfeit Detection Technology," IEEE Symposium on Technologies for Homeland Security (2016).

K. Haulmark et al., "A Custom IC for the General Characterization and Simulation of Second Order Effect Systems," GOMACTech Conf. (2020).

P. Tangyunyong et al., "Various Applications of Power Spectrum Analysis (PSA)," GOMACTech Conf, Mar. 2017.

P. Tangyunyong et al., "Power Spectrum-Analysis (PSA)," Symposium on Testing and Failure Analysis, Nov. 2017.

\* cited by examiner

AUTHENTICATING ELECTRONIC DEVICES VIA MULTI TONE ANALYSIS

CROSS REFERENCE TO RELATED APPLICATION

This application claims the benefit of and priority to provisional patent application Ser. No. 63/286,677, filed on Dec. 7, 2021 and Ser. No. 63/346,386, filed on May 27, 2022, both provisional patent applications entitled MULTI-TONE ANALYSIS TO AUTHENTICATE ELECTRONIC DEVICES, which provisional patent applications are incorporated herein by reference in their entireties.

GOVERNMENT INTEREST

The invention described herein may be manufactured and used by or for the Government of the United States for all governmental purposes without the payment of any royalty.

FIELD OF THE DISCLOSURE

The present disclosure relates generally to authenticating electronic devices.

BACKGROUND

Large electronic platforms have encountered major performance and reliability issues due to an increased number of incidents with counterfeit electronic parts. This has drawn the attention of Department of Defense (DOD) leadership making detection and avoidance of counterfeit electronic parts a top issue for national defense. More defined regulations and processes for identifying, reporting, and disposing of counterfeit electronic parts are being revised to raise awareness for this issue, as well as enhance the detection of these parts. Multiple technologies are currently employed throughout the supply chain to detect counterfeit electronic parts.

Unfortunately, conventional methods of authenticating electronic devices, including transistors, processors, application specific integrated circuits (ASICs), field programmable gate arrays (FPGAs), and other general integrated circuits (ICs) are often costly, time consuming, or destructive. This is because, as a rule, these devices contain nonlinear electronic circuits whose behavior is difficult to predict outside of a normal operating range.

There remains a need for systems and methods suitable for authenticating electronic devices and that avoid complications associated with conventional methods.

SUMMARY OF THE INVENTION

The present invention overcomes the foregoing problems and other shortcomings, drawbacks, and challenges of conventional systems and methods of authenticating electronic devices. While the invention will be described in connection with certain embodiments, it will be understood that the invention is not limited to these embodiments. To the contrary, this invention includes all alternatives, modifications, and equivalents as may be included within the spirit and scope of the present invention.

Various deficiencies in the prior art are addressed below by the disclosed systems, methods, and apparatus configured to provide a Multi Tone Analysis (MTA) process suitable for use in authenticating electronic devices including transistors, processors, application specific integrated circuits (ASICs), field programmable gate arrays (FPGAs), and other general integrated circuits (ICs). The devices contain nonlinear electronic circuits whose behavior is difficult to predict outside of normal operating conditions.

According to one embodiment, a method for authenticating an electronic device under test (DUT) of a type of DUT comprises imparting, to the (DUT), multiple voltage tones proximate identified frequencies of interest associated with the type of DUT; determining, using measurement responses of the DUT to the multiple voltage tones, an electronic signature of the DUT; and determining that the DUT is authentic in response to the electronic signature of the DUT substantially matching an electronic signature of an authentic device of the same type.

Some embodiments of the present invention are directed to a method for authenticating a device under test (DUT) of a type of DUT includes imparting voltage tones to the DUT. The voltage tones are proximate a frequency of interest that is associated with the type of DUT. Using a measurement response of the DUT to the voltage tones, an electronic signature of the DUT is determined. The DUT is determined to be authentic when the electronic signature of the DUT substantially matches an electronic signature of an authentic DUT of the type of DUT.

Other embodiments of the present invention include an apparatus for authenticating an electronic device of a type of electronic device. The apparatus includes a signal generator and a measurement apparatus. The signal generator is operably coupled to the electronic device and configured to generate and apply an input stimulus to the electronic device. The input stimulus includes voltage tones proximate a frequency of interest associated with the type of electronic device. The measurement apparatus is operably coupled to the electronic device and configured to measure an electronic response of the electronic device to the applied input stimulus. The measured electronic response defines a respective electric signature for the electronic device. The electronic device is determined to be authentic when the electronic signature of the electronic device substantially matches an electronic signature of an authentic electronic device of the type of electronic device.

Yet still other embodiments of the present invention include a method for authenticating an electronic device under test (DUT) of a type of DUT by imparting voltage tones to the DUT. The voltage tones are proximate each of a plurality of frequencies of interest that is associated with the type of DUT. Using a measurement response of the DUT to the voltage tones, an electronic signature of the DUT is determined. The DUT is determined to be authentic when the electronic signature of the DUT substantially matches an electronic signature of an authentic DUT of the type of DUT.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
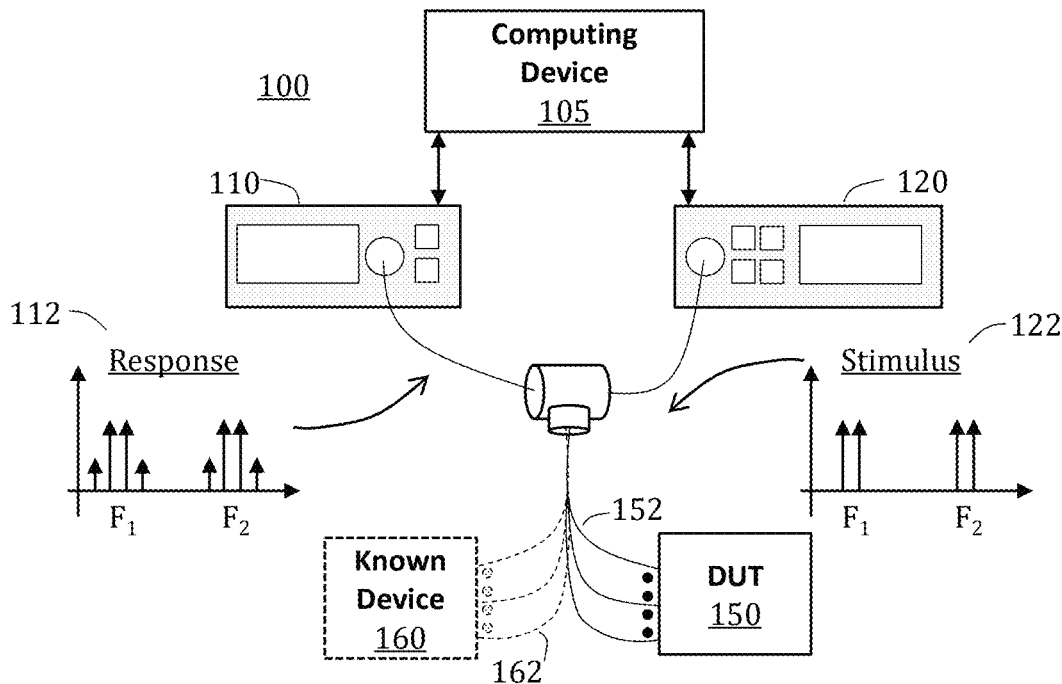
FIG. 1 is a schematic representation of a system useful in illustrating various embodiments configured for reflection measurements with one or more Device Under Test (DUT) connections.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The various embodiments provide a Multi Tone Analysis (MTA) process suitable for use in authenticating electronic devices including transistors, processors, application specific integrated circuits (ASICs), field programmable gate arrays (FPGAs), and other general integrated circuits (ICs).

The MTA process contemplates a finite set of continuous wave frequencies (tones) applied to one or more ports of a suspect device as an input stimulus, targeting a resonant frequency or frequencies of the suspect device as observed from the suspect device pin(s). The suspect device's spectral response to the stimulus is unique to the suspect device; the spectral response being a function of the suspect device architecture, layout, fabrication process, base materials, age, and various other properties, as well as the input stimulus (e.g., tones) applied to the suspect device. Underlying differences in these properties are manifested in the spectral response, and these differences are used by the MTA process to evaluate authenticity of a suspect device. Specifically, quantifiable results stem from a comparison of the spectral response of suspect devices to a spectral response of a known device, yielding statistical and empirical authentication methods as will be discussed in more detail below.

Referring now to the figures, FIG. 1 depicts a schematic representation of a system 100 configured to provide an input stimulus 122 and to detect or measure reflection measurements for a Device Under Test (DUT) 150 connection 152 according to one embodiment of the present invention. Specifically, as depicted in FIG. 1, the input stimulus 122 is generated as an output of a signal generator 120 that is operably coupled to both the DUT 150 and a measurement apparatus 110, such as by using a three-way connector 130. As depicted, the measurement apparatus 110 provides measurement response 112 to a computing device 105 where the results are recorded, stored, processed, and so on as described in more detail below.

The signal generator 120 may comprise an arbitrary waveform generator or signal source, a function generator, or any other mechanism which outputs a known, deterministic signal operable as the input stimulus 122, such as a voltage stimulus signal as generally described herein. The measurement apparatus 110 may comprise a spectrum analyzer, a digitizer, an oscilloscope, a vector network analyzer, or any other voltage measurement system operable to detect and measure the measurement response 112.

The three-way connector 130 may comprise a tee connector, a circulator, a directional coupler, or any other three port coupling device capable of conveying the input stimulus 122 from the signal generator 120 to the DUT 150 and the corresponding measurement response 112 of the DUT 150 to the measurement apparatus 110. The input stimulus 122 may be coupled into the DUT via one or more connections 152 as depicted in FIG. 1.

Similarly, or alternatively, and as shown in phantom of FIG. 1, the three-way connector 130 may be coupled to a known device 160 by way of at least one connection 162. As such, the input stimulus 122 may be provided by the signal generator 120 to the known device 160 and measurement responses 112 received from the known device 160 by the measurement apparatus 110 in a like manner so as to determine a signature indicative of authenticity for that type of known device 160.

The computing device 105 may comprise any computing device suitable for performing the various functions described herein, such as receiving the measurement response 112 from the measurement apparatus 110, controlling (or receiving an indication of) the input stimulus 122 provided by the signal generator 120, performing the various other functions described herein, and combinations thereof.

Figure 2:
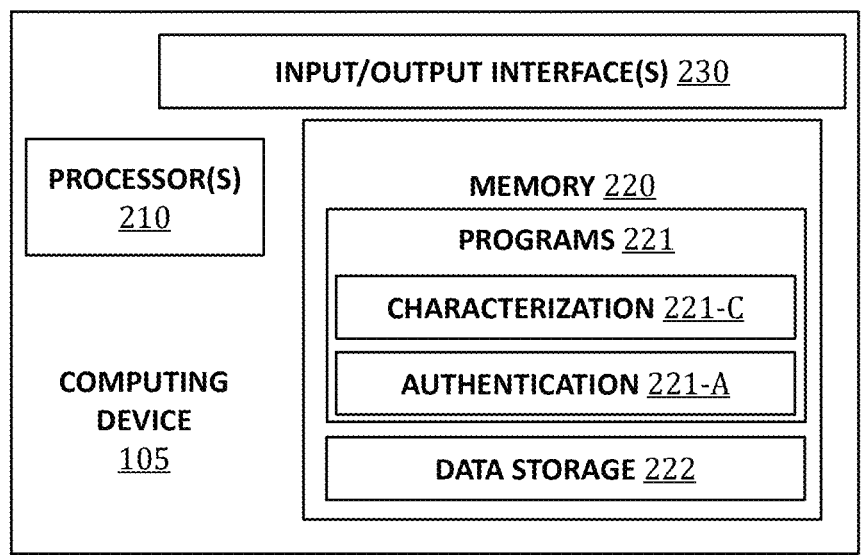
FIG. 2 is a high-level block diagram of a simplified computing device suitable for use in various embodiments.

FIG. 2 depicts a high-level block diagram of the simplified computing device 105 suitable for use in various embodiments of the present invention. Specifically, FIG. 2 depicts a computing device 105 that may be configured to perform various computing, processing, control, storage, authentication, characterization and/or other functions such as described herein with respect to the various figures.

As depicted in FIG. 2, the computing device 105 includes one or more processors 210, a non-transitory memory 220, and input-output (I/O) interface(s) 230. The processor(s) 210 are coupled to each of memory 220 and I/O interfaces 230.

The processor(s) 210 are configured for controlling the operation of the computing device 105, including operations supporting the methodologies described herein with respect to the various embodiments. Similarly, the memory 220 is configured for storing information suitable for use by the processor(s) 210. Specifically, the memory 220 may store programs 221, data 222, and so on. Within the context of the various embodiments, the programs 221 and data 222 may vary depending upon the specific functions implemented by the computing device 105. For example, as depicted in FIG. 2, the programs 221 of memory 220 includes a characterization program 221-C and an authentication program 221-A. Other programs may be included within the memory 220 as needed to implement functions discussed herein with respect to the various embodiments.

Generally speaking, the memory 220 may store any information suitable for use by the computing device 105 in implementing one or more of the various methodologies or mechanisms described herein. It will be noted that while various functions are associated with specific programs or databases, there is no requirement that such functions be associated in the specific manner. Thus, any implementations achieving the functions of the various embodiments may be used.

The I/O interface 230 may be used to couple the computing device 105 to the measurement apparatus 110 (FIG. 1), the signal generator 120 (FIG. 1), and/or other devices, modules, functional elements, and the like as described herein.

As such, the various functions depicted and described herein may be implemented via computing elements or portions thereof as hardware or a combination of software and hardware, such as by using a general-purpose computer, one or more ASIC, or any other hardware equivalents or combinations thereof. In various embodiments, computer instructions associated with a function of an element or portion thereof are loaded into a respective memory and executed by a respective processor to implement the respective functions as discussed herein. Thus, various functions, elements and/or modules described herein, or portions thereof, may be implemented as a computer program product wherein computer instructions, when processed by the computing device 105, adapt the operation of the computing device 105, such that the methods or techniques described herein are invoked or otherwise provided. Instructions for invoking the inventive methods may be stored in tangible and non-transitory computer readable medium such as fixed or removable media or memory, or the instructions may be stored within the memory 220 within the computing device 105 operating according to the instructions.

It is contemplated that some of the steps discussed herein as software methods may be implemented within special-purpose hardware, for example, as circuitry that cooperates with the processor to perform various method steps. Although primarily depicted and described as having specific types and arrangements of components, it will be appreciated that any other suitable types and/or arrangements of components may be used for computing device 105.

Figure 3:
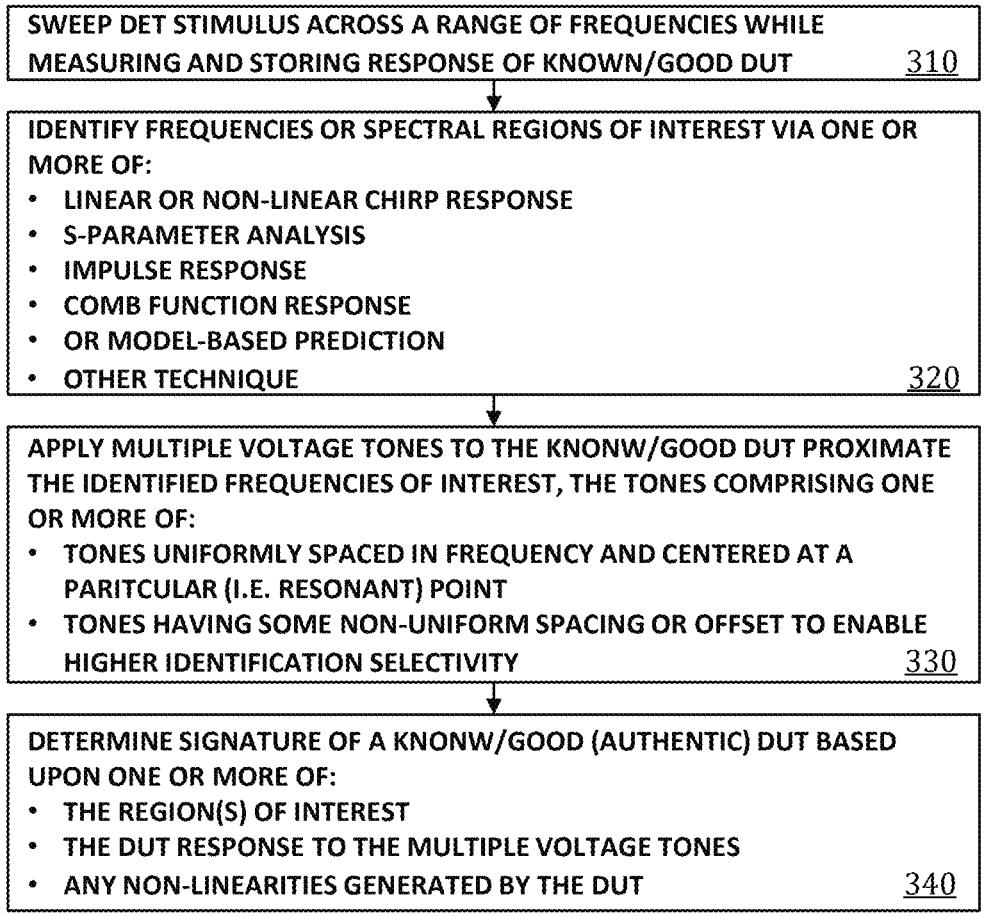
FIG. 3 is a flow diagram of a method of characterizing a known device to determine a signature indicative of authenticity for that type of known device.

FIG. 3, with reference to FIG. 1, depicts a flow diagram of a method 300 for characterizing a known device 160 to determine a signature indicative of authenticity (i.e., the measurement response 112 for the known device 160), which may be representative for that type of known device 160. Specifically, the method 300 utilizes, illustratively, the physical connections 162 discussed above with respect to the system 100. Various response parameters of the known device 160 are determined so as to characterize the signature of authenticity of the known device 160. Multiple known devices 160 may be used to determine an expected response range of the type of known device 160.

At step 310, at the onset of testing where the known device 160 is connected as contemplated in FIG. 1, the signal generator 120 applies the input stimulus 122 to the known device 160 across a range of frequencies, the measurement apparatus 110 measures the measurement response 112 across the range of frequencies and provides this data to the computing device 105 with the unique loading of the known device 160 being contained in the measurement response 112. The range of frequencies may be limited to relevant spectral regions or may be broadened to include spectral regions of lesser or unknown relevance to the determination of authenticity.

At step 320, from the recorded measurement response 112, frequencies of interest are identified within an overall frequency range. The frequencies of interest (or points within the swept spectrum) may comprise specific frequencies such as those associated with amplitude maxima (and/or minima) as measured by the measurement apparatus 110 during the sweep across the range of frequencies. It may represent frequencies at which the response of the known device 160 is unique or sensitive to alternation. The method used to identify relevant spectral regions may consist of, but are not limited to, a linear or non-linear chirp response, S-Parameter analysis, and impulse response, step response, comb function response, or model-based prediction.

At step 330, once the regions or frequencies of interest are identified and recorded, multiple voltage tones are coupled into the known device 160 around the frequencies of interest (e.g., assume two frequencies or spectral points of interest, F1 and F2) via the signal generator 120 while the measurement response 112 of the known device 160 is recorded by the measurement apparatus 110 and stored by the computing device 105. The voltage tones may be uniformly spaced in frequency and centered at F1 and F2 (i.e., resonant point(s)), or may have some non-uniform spacing or offset to enable higher identification selectivity.

At step 340, a signature of the known device type is determined as the frequencies of interest (e.g., F1 and F2 in this example), the multi-tone spectral response of the known device 160, any non-linearities generated by the known device 160, or combinations thereof. That is, assuming the known device 160, the measurement response 112 of that known device 160 to the input stimulus 122 that is spectrally proximate the frequencies of interest (F1 and F2) serves as a signature of the type of known device 160 or part due to the loading and intermodulation distortion unique to the known device 160. Subsequently, suspect devices (that is, DUTs 150) can be interrogated in the same way and compared to the signature of the known device 160 during an authentication process.

Figure 4:
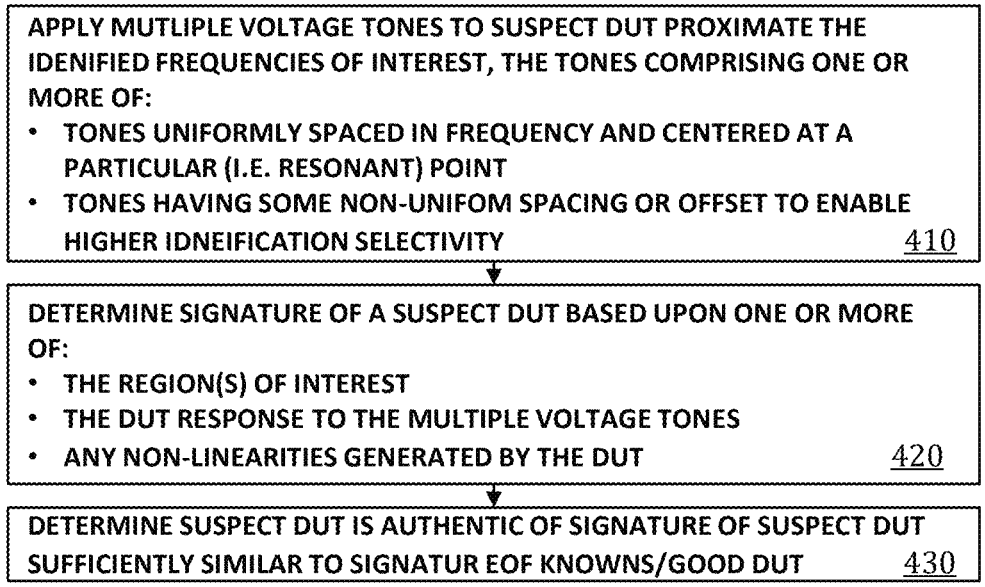
FIG. 4 is a flow diagram of a method of authenticating a DUT according to one embodiment of the present invention.

FIG. 4, with reference still to FIG. 1, depicts a flow diagram of a method of authenticating a DUT 150. Various response parameters of the suspect (unauthenticated) DUT 150 are determined and compared to the signature characterizing the known device 160, wherein the DUT 150 is of the same type as the known device 160, such as determined using the method 300 of FIG. 3.

At the onset of testing a suspect DUT 150 is connected as contemplated in FIG. 1 such that the DUT 150 is stimulated in the same way as the known device 160. That is, the signal generator 120 applies the input stimulus 122 to the DUT 150 across a range of frequencies. The measurement apparatus 110 measures the measurement response 112 across the range of frequencies and provides this data to the computing device 105 with the unique loading of the DUT 150 being contained in the measurement response 112.

Specifically, at step 410, multiple voltage tones (two or more) are coupled into the DUT 150 around the frequencies of interest previously determined in accordance with the method 300 (FIG. 3) using the known device 160. The frequencies of interest (e.g., F1 and F2 in this example) are applied via the signal generator 120, and the suspect DUT 150 measurement response 112 is recorded by the measurement apparatus 110 and stored by the computing device 105. The voltage tones may be uniformly spaced in frequency and centered at F1 and F2 (i.e., resonant point(s)), or may have some non-uniform spacing or offset to enable higher identification selectivity. Generally, the voltage tones used in stimulating the DUT 150 should be similar to those used for the known device 160 so that a more complete comparison can be made.

At step 420, a signature of the suspect DUT 150 is determined in the same manner as previously described with respect to step 340 (FIG. 3); namely, via the frequencies of interest (e.g., F1 and F2 in this example), the multi-tone measurement response 112 of the suspect DUT 150, any non-linearities generated by the suspect DUT 150, or combinations thereof.

At step 430, the signature of the suspect DUT 150 is compared to the signature of the known device 160 of the same type. If the signatures are sufficiently similar, then the suspect DUT 150 is determined to be an authentic device of the same type as the known device 160; otherwise, the suspect DUT 150 is not authenticated and may be counterfeit, corrupt, faulty, or failed. Similarity between parts depends on the part type and measurement parameters used in assessment. Similarity may be determined statistically or by other similar known methods of comparison that would be understood by the skilled artisan having the benefit of the disclosure made herein.

An authentic device type may be associated with a version of an electronic device, a manufacturing lot and/or date of the electronic device, a variation of the electronic device, and so on. The electronic signature associated with an electronic device of a particular type may be determined using tones appropriate to the type of electronic device and sufficient to enable a comparison or statistical correlation between a DUT electronic signature and an electronic signature of an authentic device. The signature of an authentic device may be determined using a single authentic electronic device or a plurality of authentic electronic devices.

Transmission Measurements and Characterization

Figure 5:
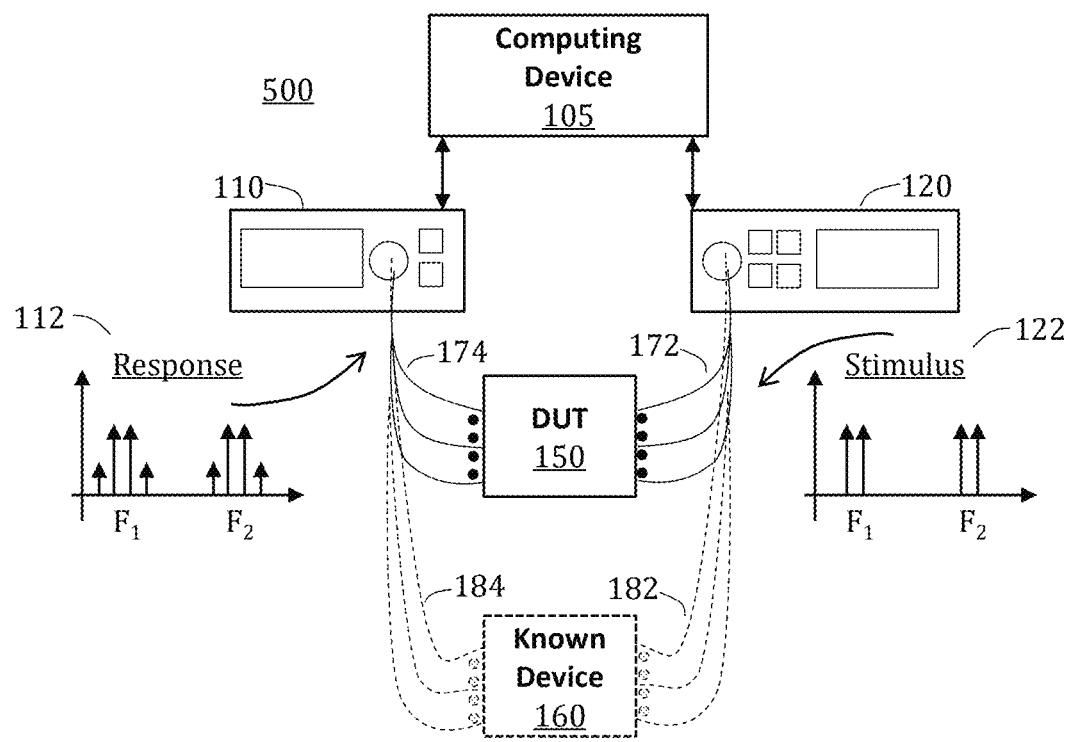
FIG. 5 is a schematic representation of a system useful in illustrating various embodiments configured for transmission measurements with one or more DUT stimulus connections and one or more DUT measurement connections.

FIG. 5 depicts a schematic representation of another system 500 useful in illustrating various embodiments of the present invention. Specifically, as depicted in FIG. 5, the output of the signal generator 120 is connected to the DUT 150 via one or more DUT connection points 172, and an input of the measurement apparatus 110 is connected to the DUT 150 via one or more DUT connection points 174. In various embodiments, each measured DUT connection point is associated with a respective input of the measurement apparatus 110.

In various embodiments, some or all of the measured DUT connection points 174 may be coupled together and to a common input of the measurement apparatus 110. As depicted, the measurement apparatus 110 provides measurement responses 112 to the computing device 105 where the measurement responses 112 are recorded, stored, processed, and so on as described in more detail herein.

The signal generator 120 and measurement apparatus 110 of FIG. 5 may be implemented in a manner substantially similar to that of the system 100 of FIG. 1. It is noted that there need not be any use of a three-way connector 130 such as described above with respect to FIG. 1.

In the embodiment of FIG. 5, the input stimulus 122 generated by the signal generator 120 may be fed directly into the DUT 150 with some fraction of the signal being transmitted through the DUT 150 and into the measurement apparatus 110. The input stimulus 112 may be coupled into the DUT 150 via one or more connections 172. Additionally, the measurement apparatus 110 may interrogate one or multiple DUT connections 174 simultaneously, giving a large set of possible measurement configurations. The known device 160 may be similarly arranged, as shown in phantom.

Characterization of Known Device

As in the reflection measurement process discussed above with respect to the method 300 of FIG. 3 and 400 of FIG. 4, a transmission measurement process may comprise similar steps, though optionally repeated for multiple different connections with the DUT 150 via the signal generator 120 and measurement apparatus 110.

Similar to the above discussion with respect to FIG. 3, a known device 160 is placed, as shown in FIG. 5, in the measurement system 500 and the input stimulus 122 is applied to the known device 160 across the range of frequencies of interest. Using the measurement apparatus 110, the measurement response 112 is recorded with the unique transmission through the known device 160 being contained in this measurement response 112. From the recorded measurement response 112, frequencies of interest where energy is coupled to the known device 160 (likely viewed as an amplitude maxima) are identified within the frequency range. These frequencies of interest represent frequencies at which the stimulus power is transmitted through the known device 160. The method used to identify these regions may consist of, but is not limited to, a linear or non-linear chirp response, S-Parameter analysis, and impulse response, step response, comb function response, or model-based prediction. Once these frequencies of interest (likely amplitude maxima) are identified and recorded, multiple voltages tones are coupled into the known device 160 around the frequencies of interest via the signal generator 120, and the measurement response 112 is recorded by the measurement apparatus 110. The voltage tones may be uniformly spaced in frequency and centered on a frequency point of interest, or they may have some non-uniform spacing or offset to enable higher identification selectivity. In either case, the maxima locations (e.g., frequencies of interest F3 and F4), the multi-tone spectral response, and any non-linearities generated by the part serve as the signature of a known (authentic) device due to the transmissions and intermodulation distortion unique to the DUT.

Subsequently, the suspect DUT 150 may be interrogated in the same manner. Specifically, similar to the above discussion with respect to FIG. 4, the suspect DUT 150 is placed as shown in FIG. 5, and a signature of the suspect DUT type is determined in the same manner as previously described; namely, via the frequencies of interest (e.g., F3 and F4 in this example), the multi-tone spectral response of the suspect DUT 150, any non-linearities generated by the suspect DUT 150, or combinations thereof. The signature of the suspect DUT 150 is compared to the signature of the known device 160 of the same type and, if sufficiently similar, the suspect DUT 150 is determined to be an authentic device of the same type as the known device 160. Similarity may be determined statistically or by other similar known methods of comparison that would be understood by the skilled artisan having the benefit of the disclosure made herein.

Figure 6:
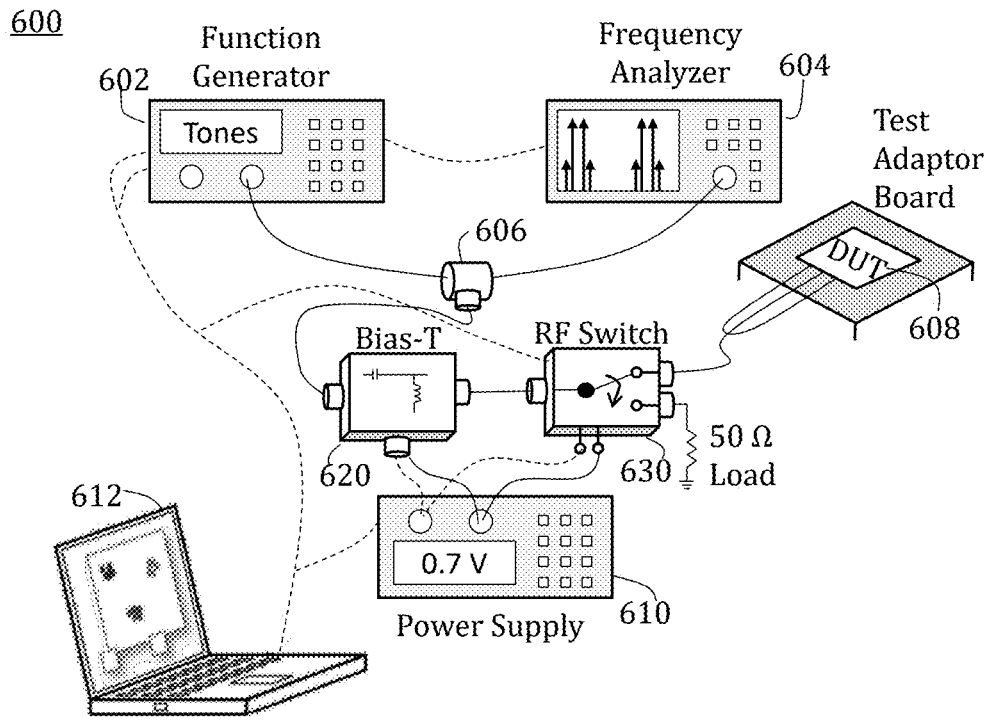
FIG. 6 is a schematic representation of a prototype for demonstrating a reflection measurement technique according to various embodiments.

FIG. 6 depicts a representation of a prototype 600 for demonstrating a reflection measurement technique suitable for use with various embodiments of the present invention. As shown in FIG. 6, a function generator 602 and a frequency analyzer 604 are connected together by a three-way connector 606 (also coupled to the computing device 612) and subsequently coupled to the DUT 608 via a bias-T 620 (for setting the common mode of the input stimulus) and an RF switch 630 (for separating the DUT 608 from the rest of the system 600).

Figure 7:
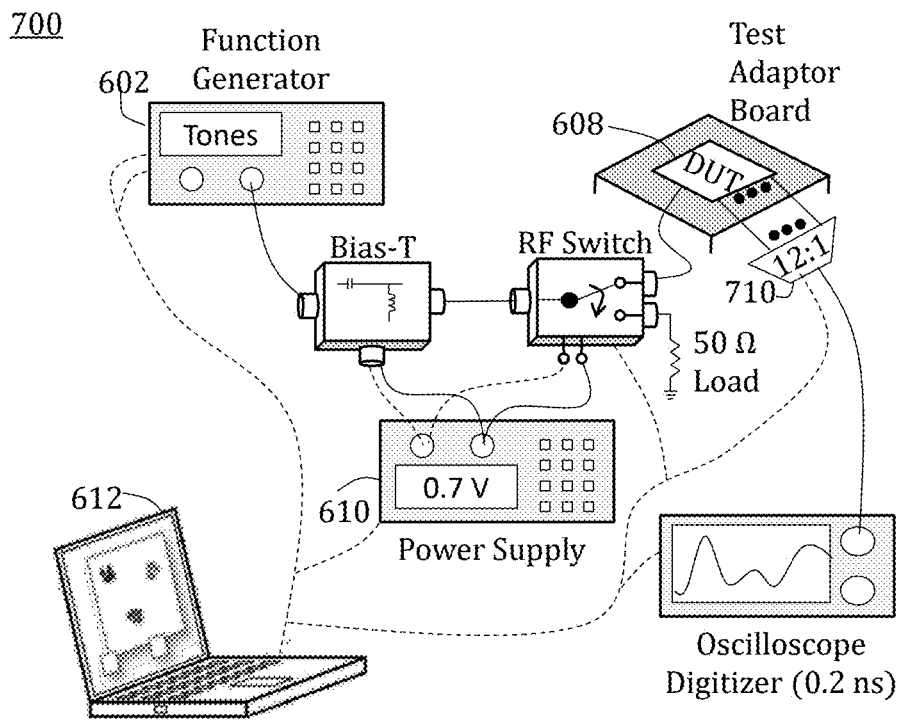
FIG. 7 is a schematic representation of a prototype for demonstrating a reflection measurement technique according to various embodiments.

FIG. 7 depicts a representation of a prototype 700 for demonstrating a reflection measurement technique suitable for use with various embodiments of the present invention. Similar to the reflection case of FIG. 6, this embodiment was set up in a controlled laboratory environment using laboratory equipment but as illustrated includes an oscilloscope 702 and Mux 710 (and without the three-way connector 606).

Figure 8:
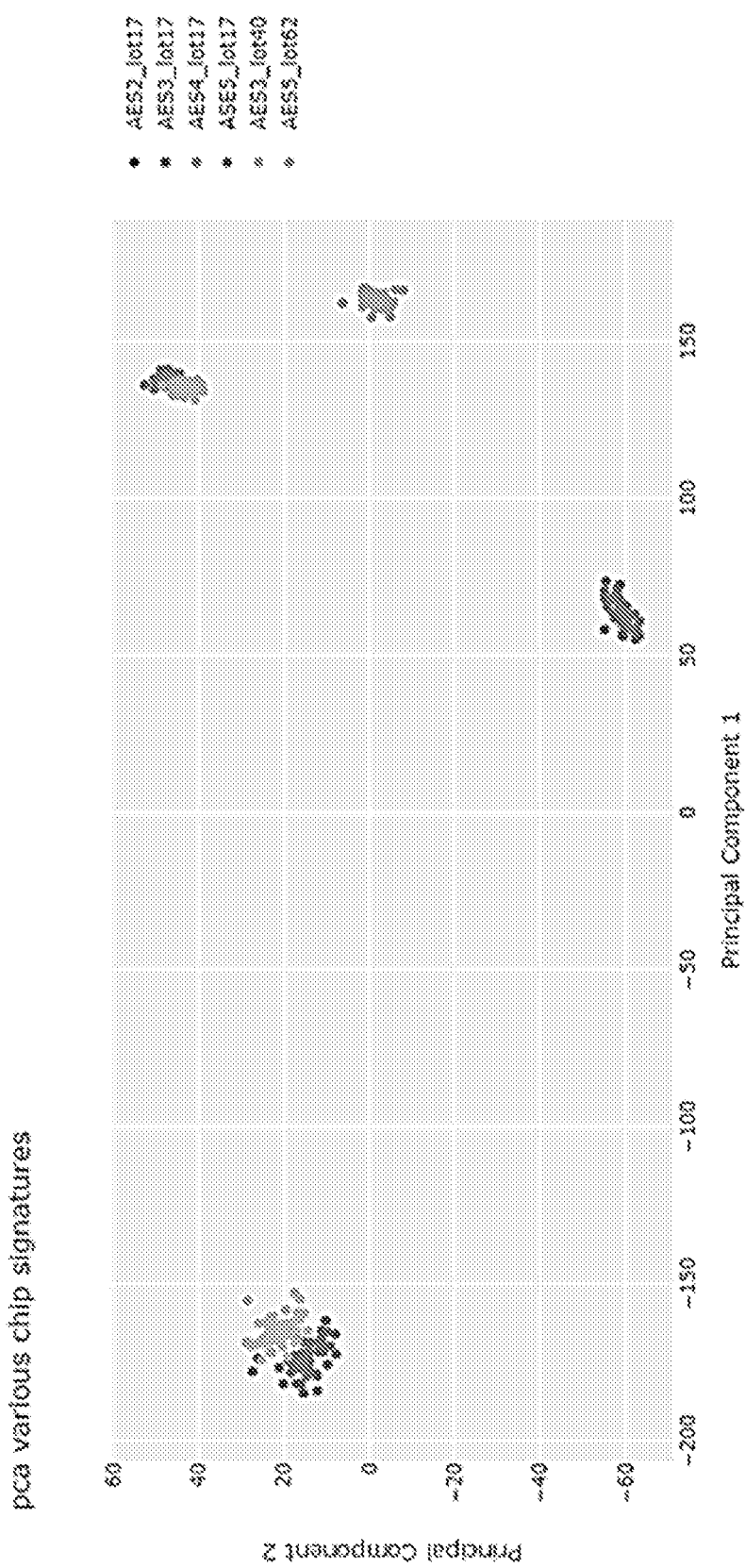
FIG. 8 graphically depicts a plot of experimental results demonstrating a differentiation of altered devices when compared to a known device.

FIG. 8 graphically depicts a plot of experimental results demonstrating a differentiation of altered devices when compared to a baseline (authentic) device. As a general demonstration, FIG. 8 shows the post processed results of one experiment. Here, each point represents a measurement of a functionally equivalent device from a family of test devices designed for this experiment. Each device in the family has essentially the same design, but with small differences purposefully introduced. These differences contribute to changes in DUT response, leading to the device signatures described in the embodiment sections above. Within FIG. 8, it can be seen that measurements from different alterations cluster together and are distinguishable from one another.

This result demonstrates the ability of the system to identify modifications and deviations from a standard, known-good part. It should be noted that the data post-processing shown below (using Principal Component Analysis (PCA)) is only one of several ways to analyze and visualize the measurement results. Alternatively, machine learning and/or clustering approaches are employed in various embodiments to convey the difference among the device types. Neural networks and dense artificial neural networks may be used to post process for classification.

Multi-Dimensional Surface Signature Example

The following example illustrates particular properties and advantages of some of the embodiments of the present invention. Furthermore, this are examples of reduction to practice of the present invention and confirmation that the principles described in the present invention are therefore valid but should not be construed as in any way limiting the scope of the invention.

Figure 9:
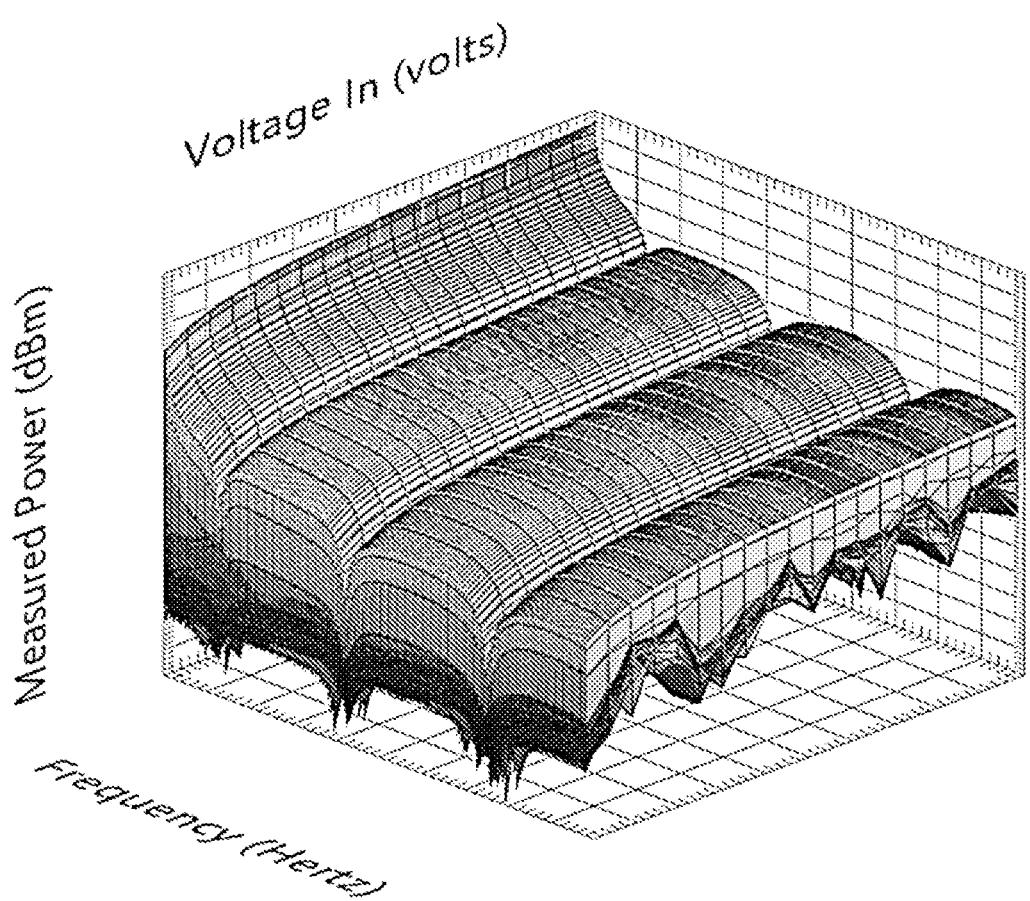
FIG. 9 graphically depicts the signature of a device demonstrated as a multi-dimensional surface and obtained in accordance with an embodiment of the present invention.

With reference now to FIG. 9, the signature of a DUT as determined in accordance with an embodiment of the present invention is graphically shown as a multi-dimensional surface. Input voltage, applied over a specified range of frequencies would result in measured power output. In this illustrative example, the three-dimensional surface is created by varying the input voltage from $V_{min}$ to $V_{max}$ with specified multiple tones across the range of frequencies. Such graphical illustration may be useful in providing a more complete description of the signature for a DUT. However, this example should not be considered limited but merely demonstrates one alternative method of viewing signatures of known devices and DUTs.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized, and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for authenticating an electronic device under test (DUT) of a type of DUT, the method comprising:
    imparting, to the DUT, first voltage tones proximate a frequency of interest associated with the type of DUT;
    determining, using measurement responses of the DUT to the voltage tones, an electronic signature of the DUT; and
    determining that the DUT is authentic in response to the electronic signature of the DUT substantially matching an electronic signature of an authentic DUT of the type of DUT wherein the frequency of interest is identified for the type of DUT wherein the electronic signature of the DUT is determined using a plurality of frequencies of interest associated with the type of DUT and the measurement responses to the first voltage tones proximate to each of the plurality of frequencies of interest.

2. The method of claim 1, wherein the first voltage tones comprise tones uniformly spaced in frequency and centered at the frequency of interest.

3. The method of claim 2, further comprising:
    imparting, to the DUT, second voltage tones proximate a resonant frequency.

4. The method of claim 3, wherein the second voltage tones comprise tones uniformly spaced in frequency and centered at the resonant frequency.

5. The method of claim 3, wherein the first voltage tones comprise tones uniformly spaced in frequency and centered at the frequency of interest and the second voltage tones comprise tones uniformly spaced in frequency and centered at the resonant frequency.

6. The method of claim 3, wherein the first voltage tones comprise tones non-uniformly spaced in frequency and offset from the frequency of interest and the second voltage tones comprise tones non-uniformly spaced in frequency and offset from the resonant frequency.

7. The method of claim 1, wherein the frequency of interest associated with the type of DUT is determined by:
    imparting, to an authentic DUT, an electronic stimulus across a range of frequencies; and
    identifying the frequency of interest from within the range of frequencies via a linear chirp response, a non-linear chirp response, an S-parameter analysis, an impulse response, a step response, a comb function response, a model-based prediction, or a combination thereof.

8. An apparatus for authenticating an electronic device of a type of electronic device, the apparatus comprising:
    a signal generator operably coupled to the electronic device and configured to generate and apply an input stimulus to the electronic device, the input stimulus comprising voltage tones proximate a frequency of interest associated with a type of electronic device;
    a three-way connector for operably coupling the measurement apparatus, the signal generator, and the electronic device; and
    a measurement apparatus operably coupled to the electronic device and configured to measure an electronic response to the applied input stimulus, the measured electronic response defining for the electronic device a respective electronic signature;
    wherein the electronic device is authentic if the electronic signature of the electronic device substantially matches an electronic signature of an authentic electronic device of the type of electronic device wherein the electronic response to the applied input stimulus comprises multiple voltage tones proximate the frequency of interest associated with the type of electronic device.

9. The apparatus of claim 8, wherein the voltage tones comprise tones uniformly spaced in frequency and centered at the frequency of interest.

10. The apparatus of claim 8, wherein the frequency of interest associated with the type of electronic device is determined by:
    imparting, to an authentic electronic device of the type of electronic device, an electronic stimulus across a range of frequencies; and
    identifying the frequency of interest from within the range of frequencies via a linear chirp response, a non-linear chirp response, an S-parameter analysis, an impulse response, a step response, a comb function response, a model-based prediction, or a combination thereof.

11. An apparatus for authenticating an electronic device of a type of electronic device, the apparatus comprising:
    a signal generator operably coupled to the electronic device and configured to generate and apply an input stimulus to the electronic device, the input stimulus comprising voltage tones proximate a frequency of interest associated with a type of electronic device;
    a computing device operably coupled to the measurement apparatus, the computing device configured for:
    storing electronic signatures of authentic electronic devices; and
    comparing an electronic signature of a device under test (DUT) to the electronic signature of the authentic electronic device of the type of electronic device wherein the electronic signature of the DUT is further determined using DUT response non-linearities characteristic of the type of DUT; and
    a measurement apparatus operably coupled to the electronic device and configured to measure an electronic response to the applied input stimulus, the measured electronic response defining for the electronic device a respective electronic signature;
    wherein the electronic device is authentic if the electronic signature of the electronic device substantially matches an electronic signature of an authentic electronic device of the type of electronic device.

\* \* \* \* \*